United States Patent
Clohessy et al.

(10) Patent No.: US 9,421,730 B2
(45) Date of Patent: Aug. 23, 2016

(54) MAT WITH REMOVABLE INFORMATION BEARING SECTION

(75) Inventors: Thomas J. Clohessy, Hicksville, NY (US); Edwin Pettersen, Chesterfield, VA (US)

(73) Assignee: Billboard Mats LLC, Chesterfield, VA (US)

( * ) Notice: Subject to any disclaimer, the term of this patent is extended or adjusted under 35 U.S.C. 154(b) by 767 days.

(21) Appl. No.: 13/199,314

(22) Filed: Aug. 24, 2011

(65) Prior Publication Data

US 2012/0052235 A1    Mar. 1, 2012

Related U.S. Application Data

(60) Provisional application No. 61/377,921, filed on Aug. 28, 2010.

(51) Int. Cl.
*E04F 11/16* (2006.01)
*B32B 3/06* (2006.01)
*B32B 5/02* (2006.01)

(52) U.S. Cl.
CPC . *B32B 3/06* (2013.01); *B32B 5/024* (2013.01); *B32B 2419/00* (2013.01); *Y10T 428/24008* (2015.01)

(58) Field of Classification Search
CPC .... A63C 19/005; A63B 6/00; A63B 2209/10; A63B 2244/102; A47G 27/0206; E04F 15/107; E04F 15/02172; E04F 2201/09; E04F 15/10; G09F 19/228
USPC ............ 52/177; 428/33, 43, 79, 86, 100, 101, 428/190, 201, 223
See application file for complete search history.

(56) References Cited

U.S. PATENT DOCUMENTS

| | | | | |
|---|---|---|---|---|
| 3,930,084 | A * | 12/1975 | Shields | 428/67 |
| 6,250,001 | B1 * | 6/2001 | Gillespie | 40/600 |
| 6,458,442 | B1 * | 10/2002 | McKay | 428/40.1 |
| 6,460,303 | B1 * | 10/2002 | Pacione | 52/311.2 |
| 6,635,331 | B2 * | 10/2003 | Kessler | 428/100 |
| 6,647,600 | B1 * | 11/2003 | Jost et al. | 24/442 |
| 6,783,829 | B2 * | 8/2004 | Arena | 428/40.1 |
| 6,849,317 | B1 * | 2/2005 | Oakey et al. | 428/88 |
| 7,329,451 | B2 * | 2/2008 | Putt et al. | 428/95 |
| 7,866,104 | B2 * | 1/2011 | Babinsky et al. | 52/403.1 |
| 7,985,143 | B1 * | 7/2011 | Daxon | 472/93 |
| 2002/0092110 | A1 * | 7/2002 | Blum et al. | 15/215 |
| 2005/0088020 | A1 * | 4/2005 | Munoz | 297/217.1 |

\* cited by examiner

*Primary Examiner* — Brian Mattei
*Assistant Examiner* — Gisele Ford
(74) *Attorney, Agent, or Firm* — Ware, Fressola, Maguire & Barber LLP

(57) ABSTRACT

A mat is formed from a first mat section and a second mat section where the second mat section is fastened to the first mat section in a cutout formed in the first mat section. The first mat section can have information placed thereon in one or more areas and can include a carpet-like material on an upper surface of an upper layer. The second mat section can be formed from an absorbent type material and can have information displayed thereon, including information displayed using a dye-sublimation print process so as to provide for multi-color high quality information. The mat is particularly suited for use in boxing rings and the like so as to prevent fluids associated with such activities from coming in contact with the floor of the boxing ring.

19 Claims, 6 Drawing Sheets

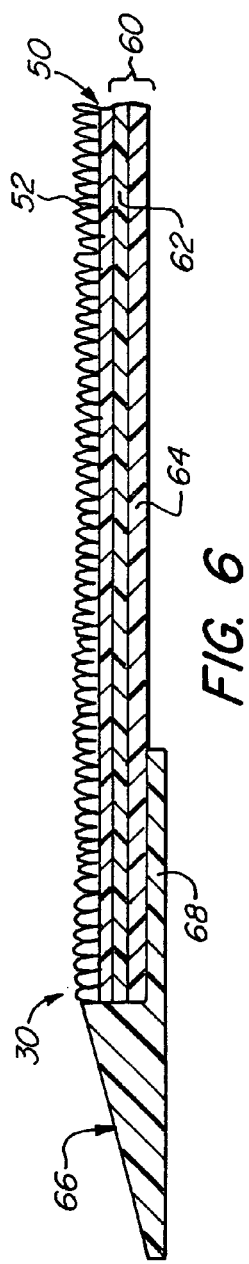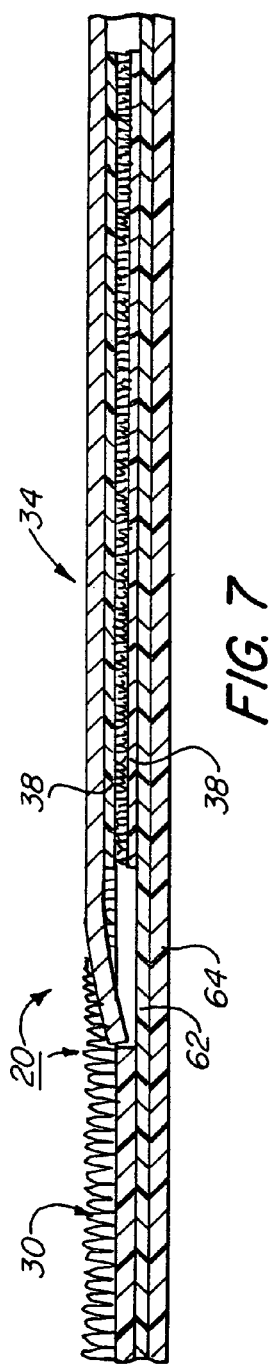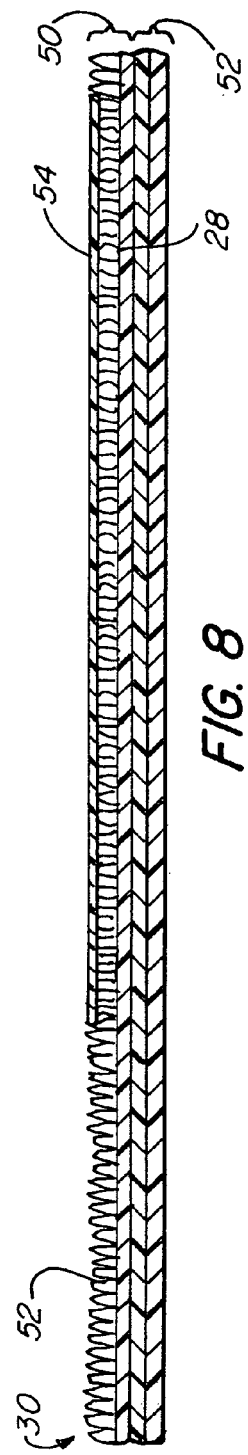

MAT WITH REMOVABLE INFORMATION BEARING SECTION

CROSS-REFERENCE TO RELATED APPLICATION

This application claims priority under 35 USC §119 to U.S. Provisional Patent Application No. 61/377,921 filed on Aug. 28, 2010.

TECHNICAL FIELD

The invention relates to mats, particularly mats placed over a flat surface, such as a floor or the canvas surface of a fighting ring or the like.

BACKGROUND OF THE INVENTION

Mats of various types have been in existence for many years. Typically, such mats are placed at entrances of buildings and other structures (e.g., tents) for purposes of cleaning the bottom surfaces of footwear prior to entry into a building or other structure. Such mats can also be used for protecting floor surfaces and the like.

It has been particularly found that in fighting rings (sometimes referred to as boxing rings), the fighters between rounds typically are attended to by one or more corner workers and during such time various fluids may come in contact with the floor surface, such as water, sweat, blood, and the like. In the past, such fluids have typically been wiped with a towel by a corner worker at the start of the next round. It has been found however, that in some instances, the floor surface of the fighting ring is not sufficiently dried which poses a significant hazard to a fighter due to slippage. It is known in the fighting profession that up to 80% of fighters can experience slips and/or falls due to such fluids on the canvas floor of the boxing ring over the course of their fighting careers. Some of these falls have caused significant injuries.

It has also been found that although various mats have been used for purposes of protecting floor surfaces from collecting dirt and the like from the undersides of footwear, there is a need for floor mats which can further provide some type of information which can be seen by people in the vicinity of the mat. Typically, this information is advertising or other information which may be useful to the person observing the mat. Although mats have been in existence which display some type of advertising or other information on the mat, there is a particular need for mats which allow different information to be presented on the mat in a straightforward and efficient manner.

SUMMARY OF THE INVENTION

An embodiment of the present invention is a mat comprising a first mat section having: an upper layer having an upper surface, the upper surface including a cutout area, and a lower layer having a lower surface and an upper surface, the upper surface including fasteners attached thereto in a space defined by the cutout area of the upper layer; and a second mat section dimensioned for receipt in the cutout area of the first mat section, the second mat section having a lower surface including fasteners for fastening to the fasteners on the upper surface of the lower layer of the first mat section.

Another embodiment of the present invention is a mat as described, wherein the second mat section is formed from a fluid absorbent material.

A further embodiment of the present invention is a mat as described above, wherein the fluid absorbent material is a felt-like material.

Another embodiment of the present invention is a mat as described above, wherein the upper surface of the second mat section is configured to display information thereon.

Another embodiment of the present invention is a mat as described above, wherein the lower surface of the lower layer of the first mat section is configured to minimize slipping of the mat when the mat is placed on another surface.

A further embodiment of the present invention is a mat as described above, wherein the fasteners of the first and second mat sections are of the hook and loop type.

A further embodiment of the present invention is a mat as described above, wherein the upper layer of the first mat section has an upper surface with a carpet-like material attached thereto.

Another embodiment of the present invention is a mat as described above, wherein a molding is attached to at least a portion of a perimeter of the first mat section.

Another embodiment of the present invention is a mat as described above, wherein display information is presented on at least an area of the upper surface of the upper layer of the first mat section.

A further embodiment of the present invention is a mat as described above, wherein the display information is on a decal affixed to the upper surface of the upper layer of the first mat section.

A still further embodiment of the present invention is a mat as described above, wherein the upper surface of the second mat section is configured for receipt of color display information thereon.

Another embodiment of the present invention is a mat as described above, wherein the color display information is multi-color display information.

Another embodiment of the present invention is a mat as described above, wherein the multi-color display information is of the dye-sublimation print type.

BRIEF DESCRIPTION OF THE DRAWINGS

FIG. 6 is a cross-sectional view of a portion of the mat taken along line 6-6 of FIG. 2.

FIG. 7 is a cross-sectional view of the mat taken along line 7-7 of FIG. 2.

FIG. 8 is a cross-sectional view of the mat taken along line 8-8 of FIG. 2.

DETAILED DESCRIPTION

Figure 1:
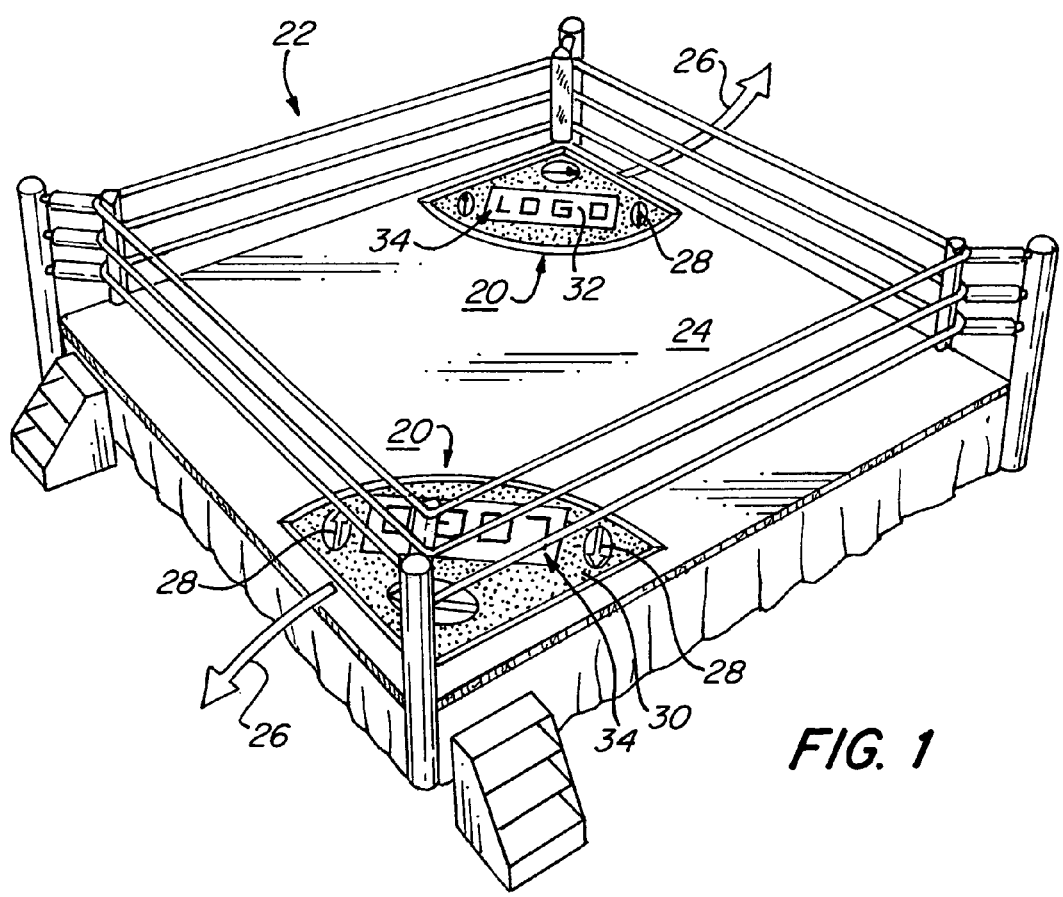
FIG. 1 is a perspective view of a boxing (fighting) ring showing two mats according to the present invention.

As seen in FIG. 1, a mat 20 according to the present invention can be placed in a corner of a boxing ring 22 or other fighter ring in which fighters compete. In such boxing rings, the fighters typically fight for a number of rounds with a short break between rounds, typically on the order of one minute.

As seen in FIG. 1, a separate mat 20 according to the present invention can be placed in each corner where a fighter moves to between rounds. When in his or her corner, the fighter is typically attended to by one or more corner workers. The mat 20 is placed on the canvas floor 24 of the ring 22 between rounds and is removed when the fighters resume fighting. As seen in FIG. 1, this is easily accomplished by simply sliding the mat off the canvas floor as indicated diagrammatically by arrow 26. Thus, the mat according to the present invention is placed on and off the canvas floor 24 between rounds.

An advantage of the mat according to the present invention is that when a fighter is sitting on a stool placed on the mat, the various fluids associated with the fighter are collected on the mat and thus do not get onto the canvas floor 24. Such fluids include sweat and blood from the fighter, as well as various fluids given to the fighter between rounds, some of which may fall onto the mat. In this manner, such fluids do not reach the canvas floor and therefore do not pose a hazard otherwise associated with such fluids when a fighter accidentally steps on wet portions of the canvas floor. In fact, it is well-known that fighters can sometimes sustain significant injuries when they accidentally slip on a canvas floor due to the fact that fluids have been left on the floor between rounds.

Figure 2:
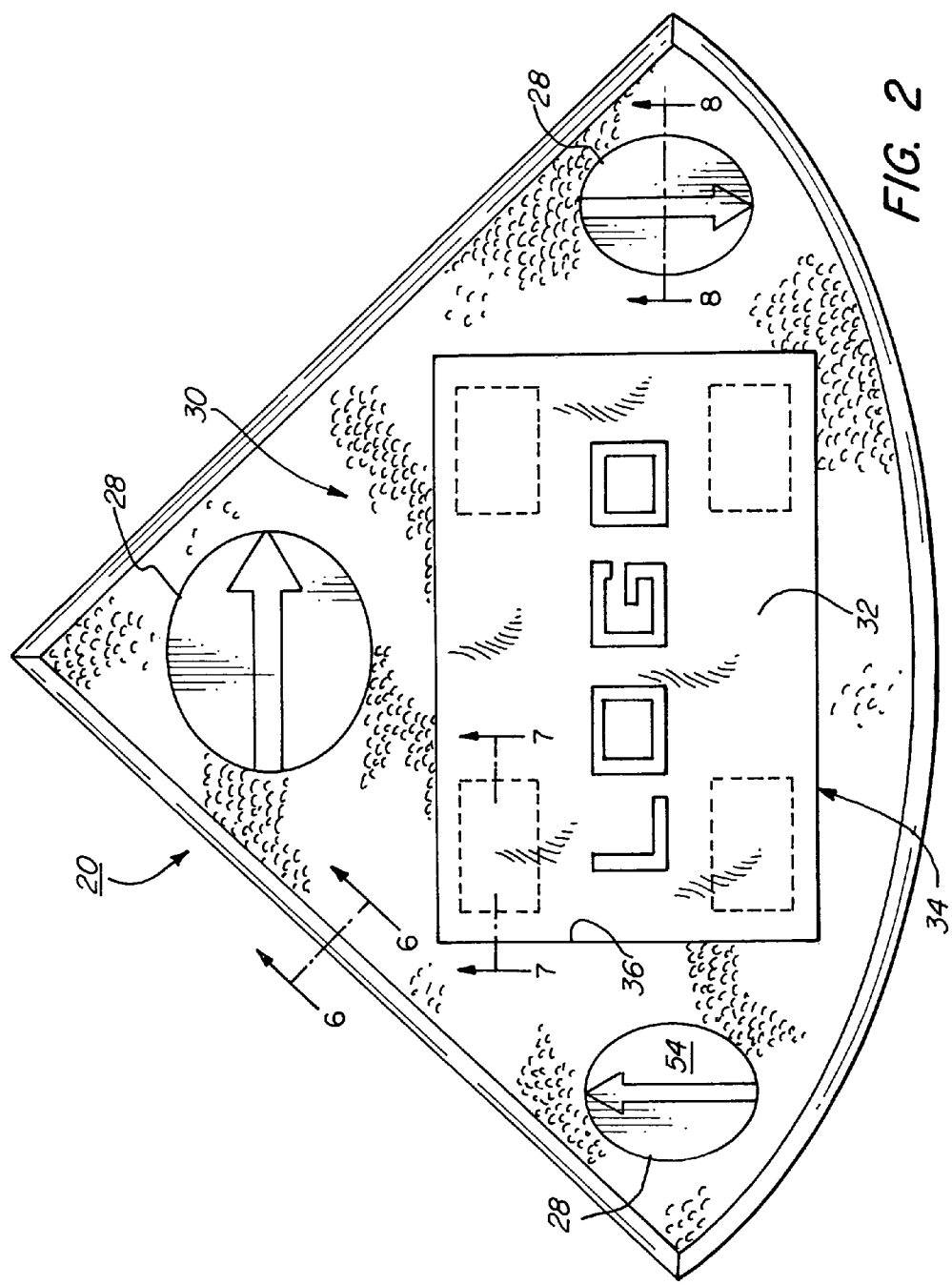
FIG. 2 is a top plan view of the mat according to the present invention as shown in FIG. 1 illustrating a first mat section and a removable second mat section having information (logo) placed thereon typically fabricated from an absorbent material.

An additional feature of the present invention is the fact that the mat according to the present invention can have information presented thereon, including information in areas 28 associated with a first mat section 30 and in area 32 associated with a second mat section 34. Although three such areas 28 are shown in FIG. 2, any number of areas can be used, or none at all. These informational areas can comprise any type of information, including advertising. The arrows are shown in areas 28 strictly for illustration purposes.

Similarly, any type of information can be placed in area 32 associated with the second mat section 34. The word "LOGO" is shown as the information in the area 32 strictly for illustration purposes. Again, such information can be advertising. More than one area 32 can be used with second mat section 34.

Figure 3:
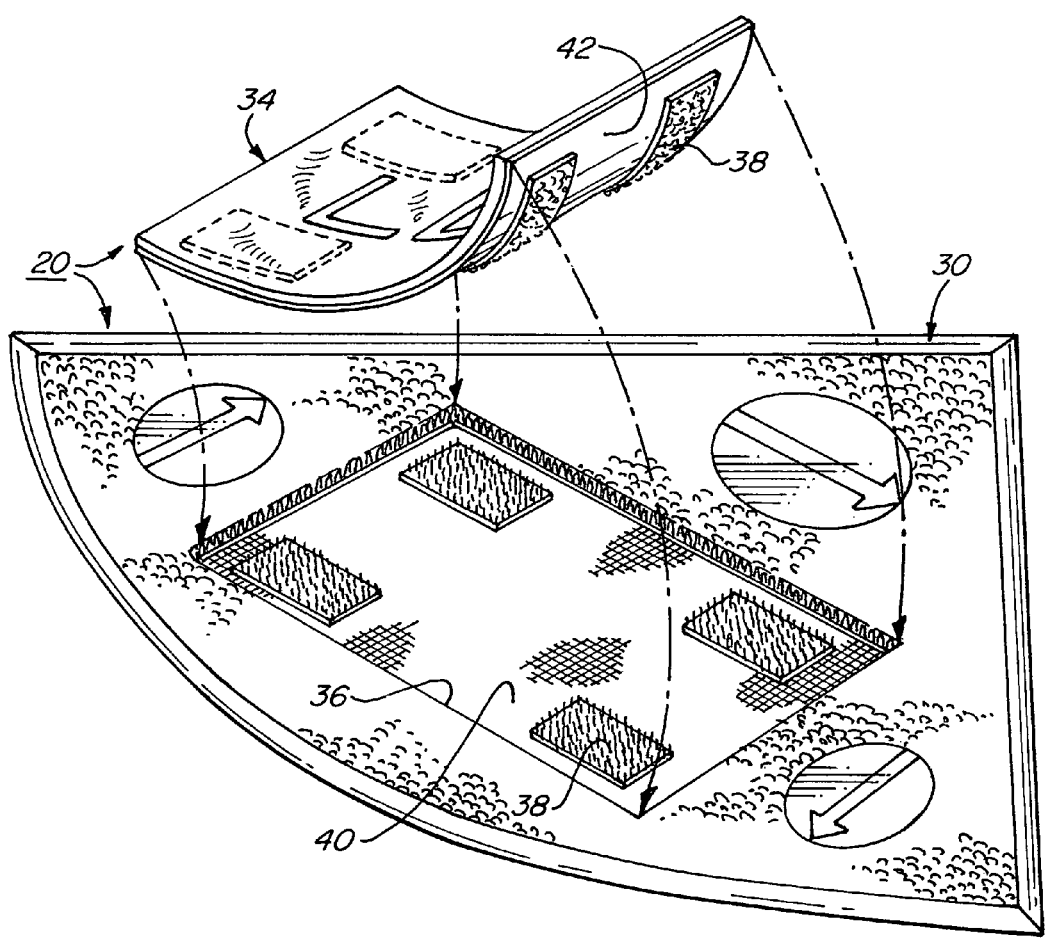
FIG. 3 is a perspective view of the mat according to the present invention, showing how the second mat section is removably secured to a cutout area in the first mat section.

FIG. 3 shows that the first mat section 30 has a cutout area 36 which is shown in an embodiment as rectangular in shape. Other cutout shapes could, of course, be formed in the first mat section.

The second mat section 34 is dimensioned to fit within cutout area 36 of the first mat section as diagrammatically illustrated in FIG. 3. Furthermore, the first mat section and the second mat section each have fasteners 38 secured thereon which are placed on an upper surface 40 of the first mat section lower layer 60 (see also FIG. 4) and a lower surface 42 of the second mat section. Such fasteners in an embodiment of the present invention can be hook-and-loop type fasteners (e.g. Velcro® type hood and loop fasteners), although other fasteners, such as sticky adhesive-type fasteners could be used. The fasteners 38 are secured to the respective surfaces of the first and second mat section by any well-known binder, such an adhesive, sonic welding, or other fasteners.

FIG. 3 illustrates that the second mat section 34 is easily removed from the cutout area 36 in the first mat section. This provides for easy changing of the second mat section. This is especially important when the mat is used between rounds of a fighting match since the second mat section can be fabricated from a fluid absorbent material so that fluids associated with the fighter (such as sweat, spit, water, blood, etc.) are absorbed by the absorbent material. The second mat section can then be removed from the first mat section and a new second mat section secured to the first mat section before the mat is again placed into the ring at the end of the next round. Furthermore, if desired, the new second mat section can have different information (such as advertising information) displayed thereon so that new information is shown on mat 20 between each round. In general, this is particularly useful when the mats are used in any environment, such as shown in FIG. 1, where absorption of fluids is necessary, and where advertising may be desirable.

Although one cutout area 36 is illustrated in the embodiment of the invention shown in FIGS. 1, 2, and 3, other embodiments of the invention could use multiple cutout areas 36 (not shown) with a corresponding number of second mat sections 34 for placement into these cutout areas.

Figure 4:
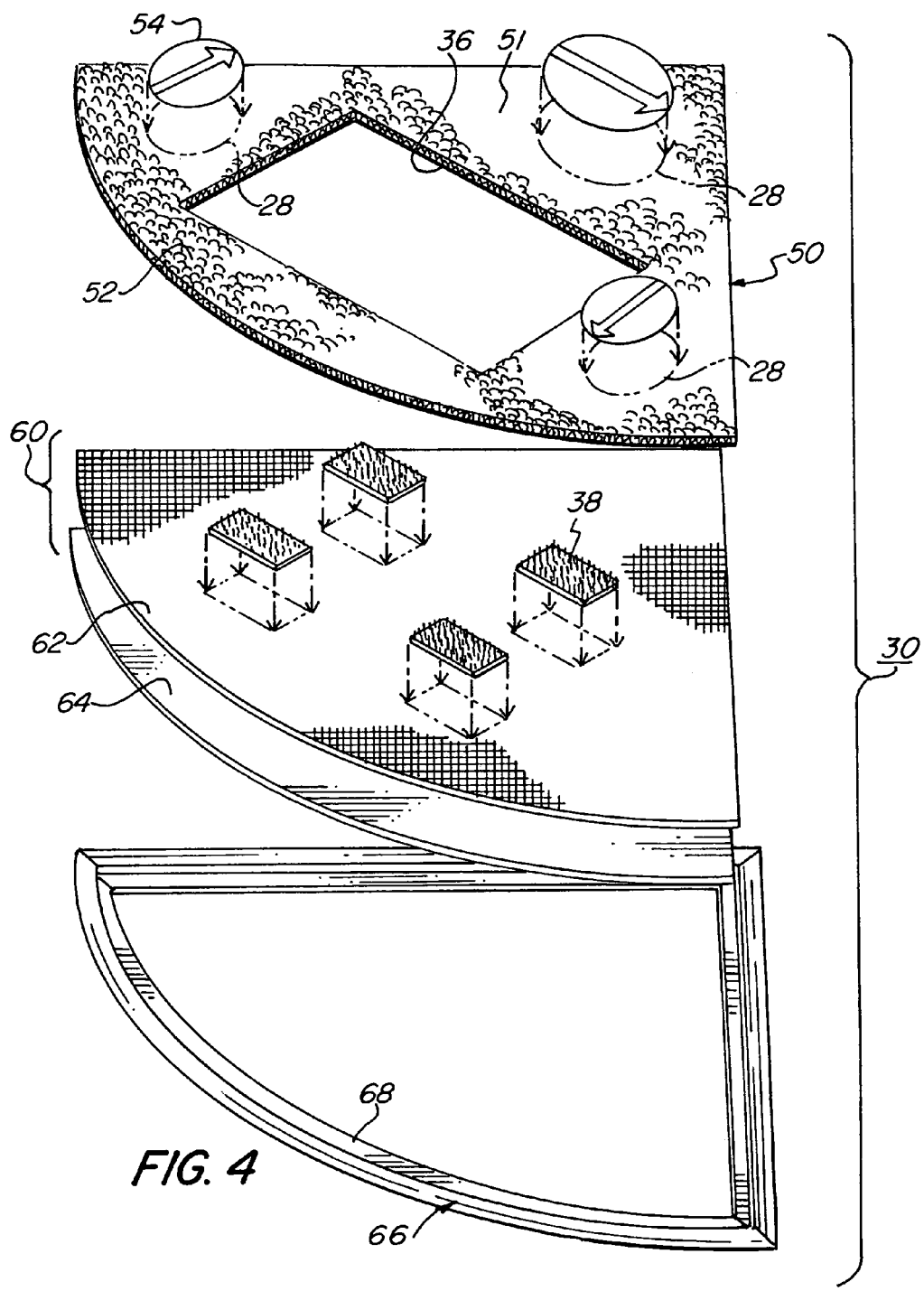
FIG. 4 is an exploded view of the first mat section showing its various elements.

Details concerning the construction of the first mat section 30 are shown in FIG. 4. Thus, in an embodiment of the present invention, the first mat section 30 has an upper layer 50 which includes the cutout area 36. This upper layer can be formed from a flexible synthetic sheet with a carpet-like material 52 affixed thereto. The carpet-like materials can be in the form of loops embedded into the sheet. Such a material can be Fusion™ tufted carpet face made with a polyester (PET) core and an ultraviolet (UV) stabilized polyvinyl chloride (PVC) coated yarn (65-75 mil coating for stability). Furthermore, areas 28 can include information thereon in the form of decals 54 placed on an upper surface 51 of upper layer 50, such as by an adhesive affixed to the back surface of the decals.

The first mat section includes a lower layer 60 that can comprise a first sheet 62 and a second sheet 64. Fasteners 38 are secured to the upper surface 40 of first sheet 62. The first sheet 62 can be formed from a woven-type fabric. This first sheet is secured to the upper layer 50 by any well-known binder, such as adhesive, sonic welding, or other fasteners. First sheet 62 in an embodiment of the invention can be a nylon-type threaded sheet forming a reinforcement to the lower layer. The second sheet 64 can be a flexible backing sheet which provides flexibility to the lower layer. The second sheet is secured to the first sheet by any well-known binder, such as adhesive, sonic welding, or other fasteners.

The lower layer of the first mat section may include a molding 66 having a perimeter that slopes downward at its outer periphery 68. The molding is dimensioned so as to receive the lower layer 60 which is in turn secured thereto by any well-known binder, such as adhesive, sonic welding, or other fasteners.

The overall configuration of the first mat section forms the permanent portion of the mat which can removably receive the second mat section. Although multiple areas 28 are shown in this first mat section, other embodiments of the invention can any number of such areas, including no area at all.

Figure 5:
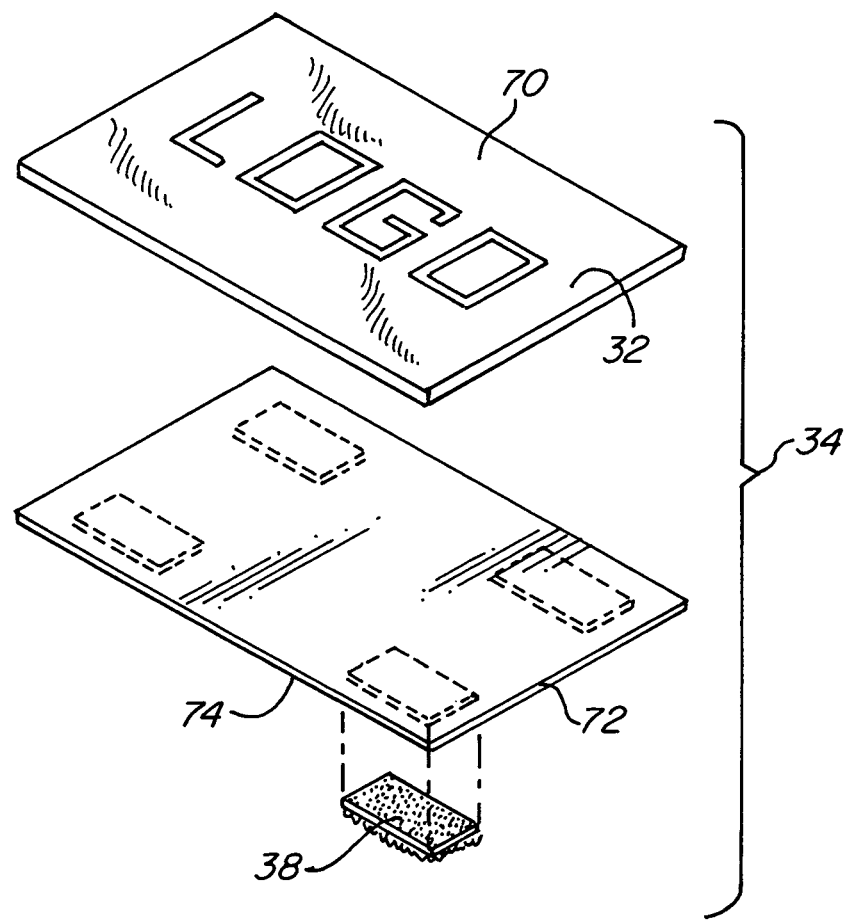
FIG. 5 is an exploded view of the second mat section showing its various elements.

Details of the second mat section 34 are shown in FIG. 5. In an embodiment of the invention, the second mat section includes a first sheet 70 and a second sheet 72 which are secured to each other by any well-known binder, such as by adhesive, sonic welding, or other fasteners. The first sheet 70 can be made from a felt-like absorbent material, particularly in applications where it is likely that fluids may fall onto the second mat section. The first sheet can also be formed from a fluid retaining material. Such a material can be a non-woven polyester with 65-75 mil PVC coating. The second sheet 72 can be formed from a flexible sheet, such as a flexible black synthetic sheet-like material. A lower surface 74 of the second sheet 72 has fasteners 38 secured thereto by any well-known binder, such as by adhesive, sonic welding, or other fasteners.

The information displayed in area 32 of the second mat section can be formed on the first sheet by any well-known technique. In a particularly advantageous embodiment where advertising information is to be displayed in area 32, the information can be impregnated into the absorbent felt-like material by a dye-sublimation print process which provides for multi-color information of high image quality. In this dye-sublimation print process, rolls of heat transferable ink are heated and applied using a heat press (not shown) to the first sheet 70, typically at temperatures of approximately 400° Fahrenheit. This process causes the inks to become embedded into fibers forming the felt-like upper surface of the sheet, resulting in the high-quality multicolored image to be permanently placed on the second sheet. Such a process allows for the second mat section to be cleaned by any well-known process, such as by shampooing, and such process does not materially adversely affect the information placed on the second area of the second mat section. Such information placed on the second mat section is also generally tolerant to abuse, such as that caused by placing a stool on the sheet, walking, scraping, and the like which can typically occur when the mat is placed in a boxing ring or any other location where activity on the mat is likely. Such information applied using such a dye-sublimation print process is typically of a high photographic type quality and also maintains washability of the second mat section.

FIGS. 6, 7, and 8 show details of the mat according to an embodiment of the present invention. Thus, FIG. 6 shows details in the vicinity of the perimeter of the first mat section 30, including illustration of the molding 66 and how a portion 68 of the molding underlies the upper and lower layers 50 and 60.

FIG. 7 taken along line 7-7 of FIG. 2 shows details of the mat in the area of cutout region 36. It illustrates how fasteners 38 attached to the first and second sections of the mat come in contact with each other to secure the second mat section to the first mat section.

Finally, FIG. 8 shows details of a decal 54 placed in an area 28 of carpet 52 of the first mat section 30. Although decals can be placed by means of an adhesive directly to the carpet-like material 52, the carpet-like material can also be removed in areas 28 where such decals or other information bearing sheets are to be placed on the upper layer 50 of the first mat section.

Although the mat shown in FIGS. 1-8 is particularly shown for use in a boxing ring or similar environment, the shape of the mat can, of course, be different from that shown in the figures. It can therefore be rectangular, elliptical, multi-sided, round, or any other shape. Its applications can therefore also include placement on other floor surfaces, such as those found in commercial, industrial, and residential buildings and especially in areas where incoming or outgoing human traffic is prevalent.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A mat comprising:
   a first mat section having:
      an upper layer having an upper surface, the upper surface including a cutout area, and
      a lower layer having a lower surface and an upper surface, the upper surface including fasteners attached thereto in a space defined by said cutout area of said upper layer; and
   a second mat section having a lower surface including fasteners that are removably attached to the fasteners on the upper surface of the lower layer of the first mat section, the second mat section having a perimeter that fits within the cutout area of the first mat section,
   wherein the second mat section includes a flexible sheet forming the lower surface upon which the fasteners are attached and another sheet forming an upper surface of the second mat section, the two sheets bonded to each other to form the second mat section.

2. The mat according to claim 1, wherein the second mat section is formed from a fluid absorbent material.

3. The mat according to claim 2, wherein the fluid absorbent material is a felt-like material.

4. The mat according to claim 2, wherein the upper surface of the second mat section is configured to display information thereon.

5. The mat according to claim 1, wherein the lower surface of the lower layer of the first mat section is configured to minimize slipping of the mat when the mat is placed on another surface.

6. The mat according to claim 1, wherein the fasteners of the first and second mat sections are of the hook and loop type.

7. The mat according to claim 1, wherein the upper surface of the upper layer of the first mat section has a carpet-like material attached thereto.

8. The mat according to claim 7, wherein the carpet-like material comprises a plurality of loops forming the carpet-like surface.

9. The mat according to claim 1, wherein a molding is attached to at least a portion of a perimeter of the first mat section.

10. The mat according to claim 9, wherein the molding is sloped.

11. The mat according to claim 1, wherein the upper layer of the first mat section is formed from a fluid retaining material.

12. The mat according to claim 1, wherein display information is presented on at least an area of said upper surface of the upper layer of the first mat section.

13. The mat according to claim 12, wherein the display information is on a decal affixed to said upper surface of the upper layer of the first mat section.

14. The mat according to claim 13, wherein the decal is affixed to the upper surface of the upper layer of the first mat section by an adhesive on a back of the decal.

15. The mat according to claim 1, wherein the upper surface of the second mat section is configured for receipt of color display information thereon.

16. The mat according to claim 15, wherein the color display information is multi-color display information.

17. The mat according to claim 16, wherein the multi-color display information is of the dye-sublimation print type.

18. The mat according to claim 1, wherein the upper surface of the lower layer of the first mat section is formed from a woven sheet, while the lower surface of the lower layer of the first mat section is formed from a flexible sheet with the woven sheet and flexible sheet adhered to each other to form the lower layer of the first mat section.

19. The mat according to claim 1, wherein the another sheet of the second mat section is formed from a felt-like material.

* * * * *